(12) United States Patent
Brown et al.

(10) Patent No.: US 7,872,384 B2
(45) Date of Patent: Jan. 18, 2011

(54) SHAFT COVER STRUCTURE FOR USE IN AN EXCITER

(75) Inventors: Joshua Brown, Concord, NC (US); Robert Jobe, Charlotte, NC (US); Alan Marfin, Charlotte, NC (US); Edward Tevis, Kings Mountain, NC (US)

(73) Assignee: Siemens Energy, Inc., Orlando, FL (US)

( * ) Notice: Subject to any disclaimer, the term of this patent is extended or adjusted under 35 U.S.C. 154(b) by 321 days.

(21) Appl. No.: 12/212,856

(22) Filed: Sep. 18, 2008

(65) Prior Publication Data
US 2010/0066186 A1 Mar. 18, 2010

(51) Int. Cl.
*H02K 5/04* (2006.01)
(52) U.S. Cl. ........................ 310/68 D; 310/72
(58) Field of Classification Search ................. 310/128, 310/143, 147, 232, 271, 68 D, 72
See application file for complete search history.

(56) References Cited

U.S. PATENT DOCUMENTS

| | | | |
|---|---|---|---|
| 2,516,016 A | 7/1950 | Pakala | |
| 2,801,070 A | 7/1957 | Purvis et al. | |
| 3,412,271 A | 11/1968 | Hall | |
| 3,590,291 A | 6/1971 | Spisak et al. | |
| 3,686,523 A * | 8/1972 | Gorden et al. | 310/72 |
| 3,829,725 A * | 8/1974 | Petersen et al. | 310/68 D |
| 4,211,946 A | 7/1980 | Eckert et al. | |
| 4,559,703 A | 12/1985 | Gagas | |
| 5,224,138 A * | 6/1993 | Hirao et al. | 378/15 |
| 6,091,173 A | 7/2000 | Byrd | |
| 6,404,082 B1 | 6/2002 | Rasinski et al. | |
| 2002/0125779 A1 | 9/2002 | Qin et al. | |
| 2003/0049073 A1 | 3/2003 | Ross et al. | |
| 2005/0067918 A1 | 3/2005 | Holter et al. | |
| 2008/0143208 A1 | 6/2008 | Zhang et al. | |

FOREIGN PATENT DOCUMENTS

| | | |
|---|---|---|
| EP | 0650241 A1 | 4/1995 |
| WO | 0033447 A1 | 6/2000 |

\* cited by examiner

*Primary Examiner*—Quyen Leung
*Assistant Examiner*—Naishadh N Desai

(57) ABSTRACT

A shaft cover structure for use in an exciter is provided. The shaft cover structure comprises at least two sections located about a selected portion of a rotatable shaft. The sections are positioned such that adjacent circumferential ends of the at least two sections are spaced apart to define gaps therebetween. A recess extends from each circumferential end such that adjacent recesses define a slot. A spanning member is disposed in each of the slots such that the sections and the spanning members cooperate to form a continuous cover member that surrounds the selected portion of the shaft. A first holding structure secures the continuous member on the selected portion of the shaft.

20 Claims, 5 Drawing Sheets

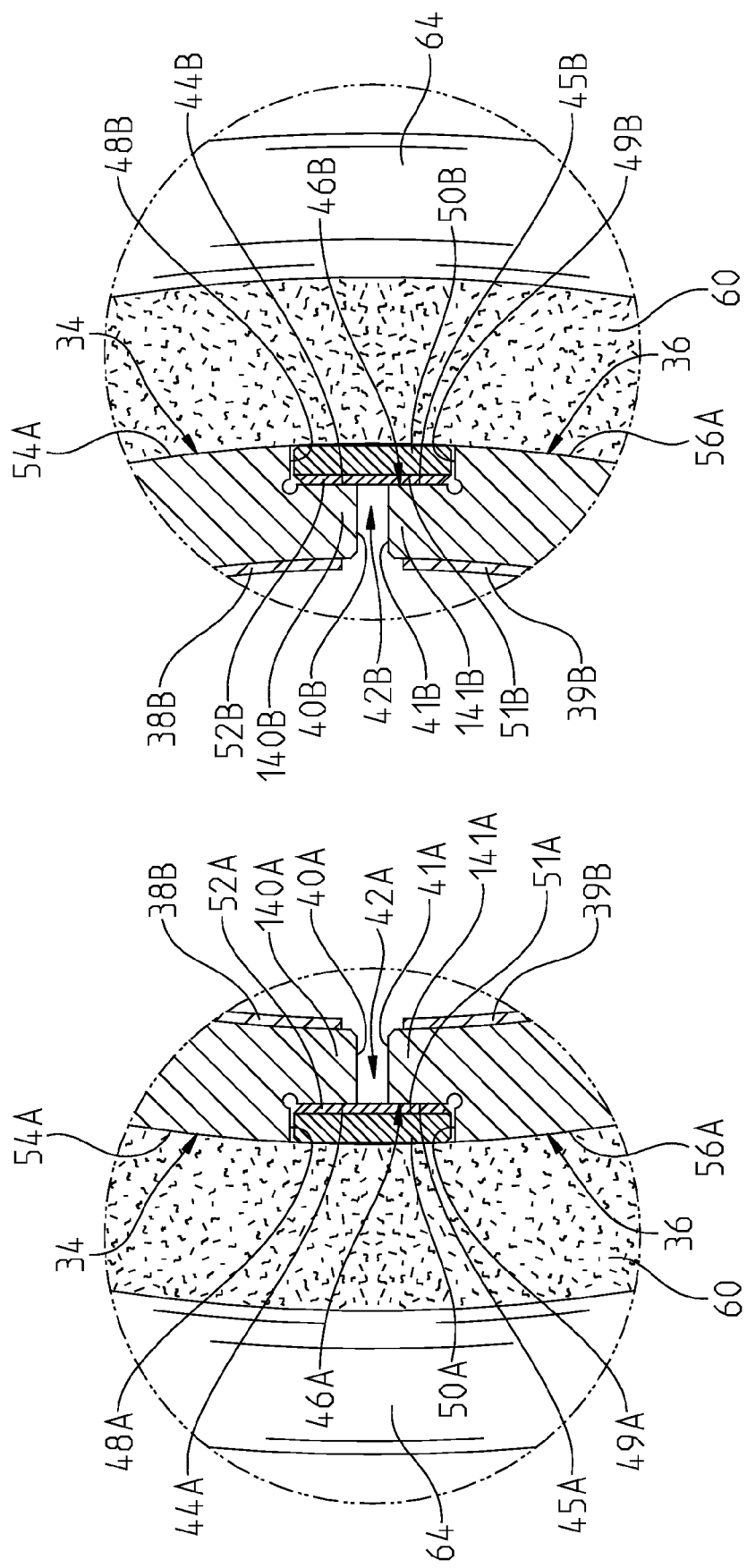

SHAFT COVER STRUCTURE FOR USE IN AN EXCITER

FIELD OF THE INVENTION

The present invention relates generally to a cover structure for a rotatable shaft in an exciter and, more particularly, to a phase lead shield that comprises two or more sections disposed about the rotatable shaft.

BACKGROUND OF THE INVENTION

In the power generation industry, it is well understood that an exciter, e.g., a brushless alternating current (AC) exciter, is often used to excite a power generator. Brushless AC exciters may include a one-piece cylindrical phase lead shield that is disposed about and rotatable with a driven shaft. The phase lead shield acts as a mechanical support for phase lead conductors that are disposed on a radially outer surface of the phase lead shield. The phase lead shield also provides a barrier for the shaft from flux created by the phase lead conductors. After periods of use, the phase lead shield may have to be removed from the shaft, i.e., to check the shaft for cracking underneath the phase lead shield. The process of removing the phase lead shield involves cutting the phase lead shield off of the shaft, which leaves the phase lead shield un-useable for re-application onto the shaft. Accordingly, a new phase lead shield must be disposed onto the shaft for continued operation of the exciter.

In current designs, other components disposed about the shaft, such as, for example, an exciter coupling, a main lead support/vent seal, diode wheels and components associated therewith, and phase lead support, must be removed from the shaft so that a new one-piece phase lead shield may be positioned onto the shaft.

SUMMARY OF THE INVENTION

In accordance with one aspect of the present invention, a shaft cover structure for use in an exciter is provided. The shaft cover structure comprises at least two sections located about a selected portion of a rotatable shaft. The sections are positioned such that adjacent circumferential ends of the at least two sections are spaced apart to define gaps therebetween. A recess extends from each circumferential end such that adjacent recesses define a slot. A spanning member is disposed in each of the slots such that the sections and the spanning members cooperate to form a continuous cover member that surrounds the selected portion of the shaft.

At least a portion of an inner surface of each of the sections may include a slip layer, which may be defined by a silver plated layer.

At least a portion of an inner surface of each of the spanning members may include a slip layer.

The spanning members may be circumferentially aligned with shaft arms defined in the shaft and may extend axially substantially parallel to the shaft arms.

The first holding structure may comprise a first glass structure wound about the continuous cover member.

At least one phase lead conductor may be located on a radially outer surface of the first glass structure.

A second holding structure including a second glass structure may secure the at least one phase lead conductor onto the outer surface of the first glass structure.

The sections and/or the spanning members may be formed from aluminum.

A first holding structure may secure the continuous member on the selected portion of the shaft.

In accordance with another aspect of the present invention, a shaft cover structure in an exciter is provided. The shaft cover structure may comprise at least one section located about a selected portion of a rotatable shaft. The at least one section is positioned such that at least one slot is defined to extend across at least one pair of adjacent circumferential ends of the at least one section. At least one spanning member is disposed in the at least one slot such that the at least one section and the at least one spanning member cooperate to form a continuous cover member that surrounds the selected portion of the shaft. A first holding structure secures the continuous member on the selected portion of the shaft.

In accordance with a yet another aspect of the present invention, a shaft cover structure in an exciter is provided. The shaft cover comprises at least two sections located about a selected portion of a rotatable shaft and positioned such that at least two slots are defined to extend across at least two pairs of adjacent circumferential ends of the at least two sections. At least one spanning member is disposed in each of the slots such that the at least two sections and the spanning members cooperate to form a continuous cover member that surrounds the selected portion of the shaft. First holding structure secures the continuous member on the selected portion of the shaft.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

FIG. 3A illustrates an enlarged axial cross sectional view of portion $3A_1$ of the phase lead shield illustrated in FIG. 3;

FIG. 3B illustrates an enlarged axial cross sectional view of portion $3A_2$ of the phase lead shield illustrated in FIG. 3.

DETAILED DESCRIPTION OF THE INVENTION

Figure 1:
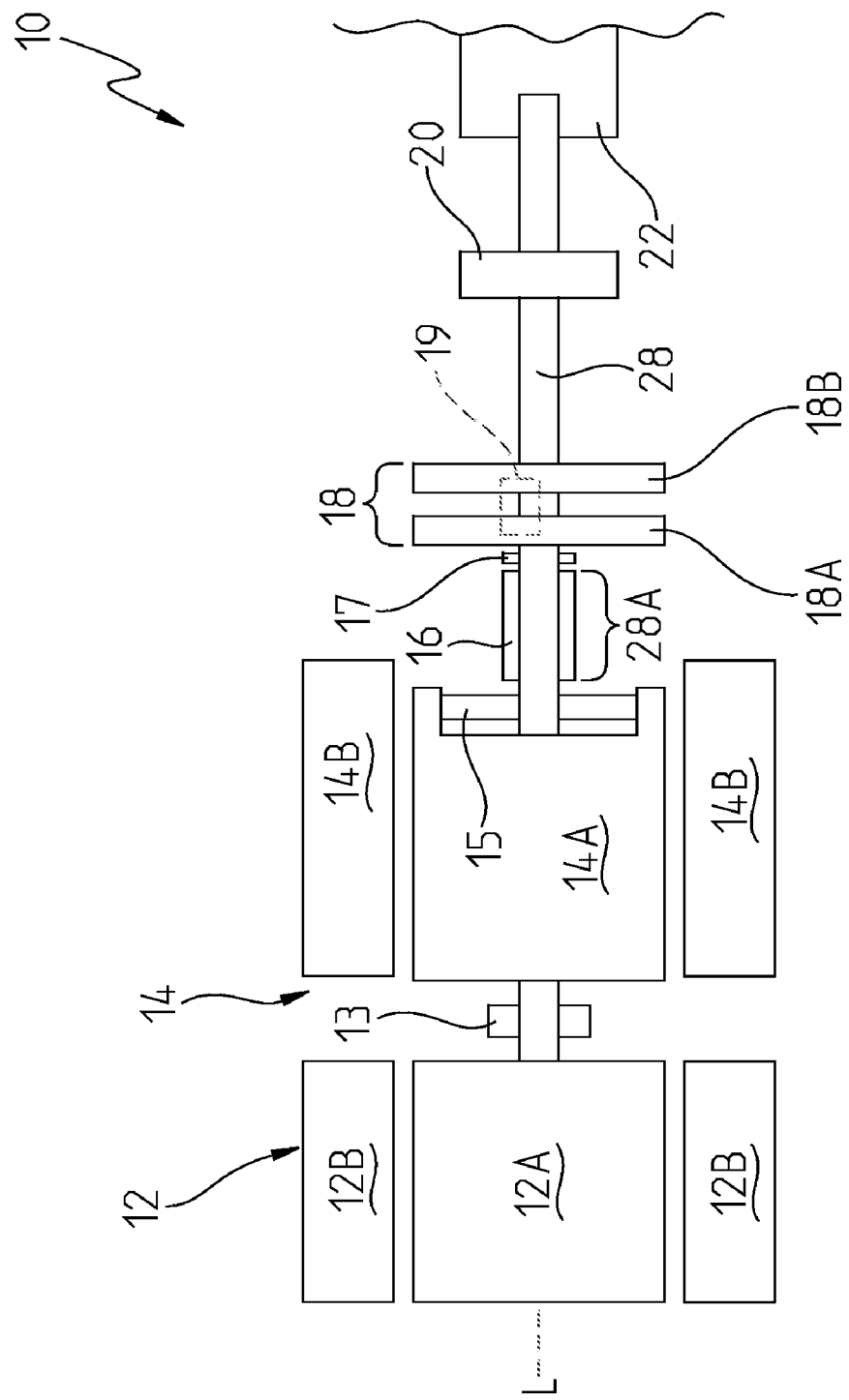
FIG. 1 is a diagrammatic illustration of a brushless AC exciter including phase lead shield for use in a power generating system in accordance with the invention.

Referring to FIG. 1, a brushless AC exciter 10 constructed in accordance with an embodiment of the present invention and adapted for use in a power generating system is shown. The brushless AC exciter 10 comprises (from left to right in the embodiment shown in FIG. 1) a permanent magnet generator 12 or pilot exciter, a ground detector ring 13, a main exciter 14, a connection ring 15, a cover structure comprising a phase lead shield 16, a phase lead support 17, a diode wheel assembly 18, a main lead support and vent seal 20, and an exciter coupling 22, which is adapted to be coupled to a synchronous power generator (not shown).

The permanent magnet generator 12 comprises rotating magnetic poles 12A and a stationary armature structure 12B The main exciter 14 comprises a rotating AC armature 14A surrounded by a stationary field structure 14B comprising stationary field poles. The diode wheel assembly 18 comprises a positive diode wheel 18A and a negative diode wheel 18B that include diode wheel assembly circuitry 19 comprising a rectifier circuit for converting AC current to DC current.

The rotating magnetic poles 12A of the permanent magnet generator 12, the ground detector ring 13, the rotating AC armature 14A of the main exciter 14, the connection ring 15, the phase lead shield 16, the phase lead support 17, the diode wheel assembly 18, and the main lead support and vent seal 20 are mounted to and rotate with a rotatable shaft 28 about a longitudinal axis L during operation of the brushless AC exciter 10.

Figure 2:
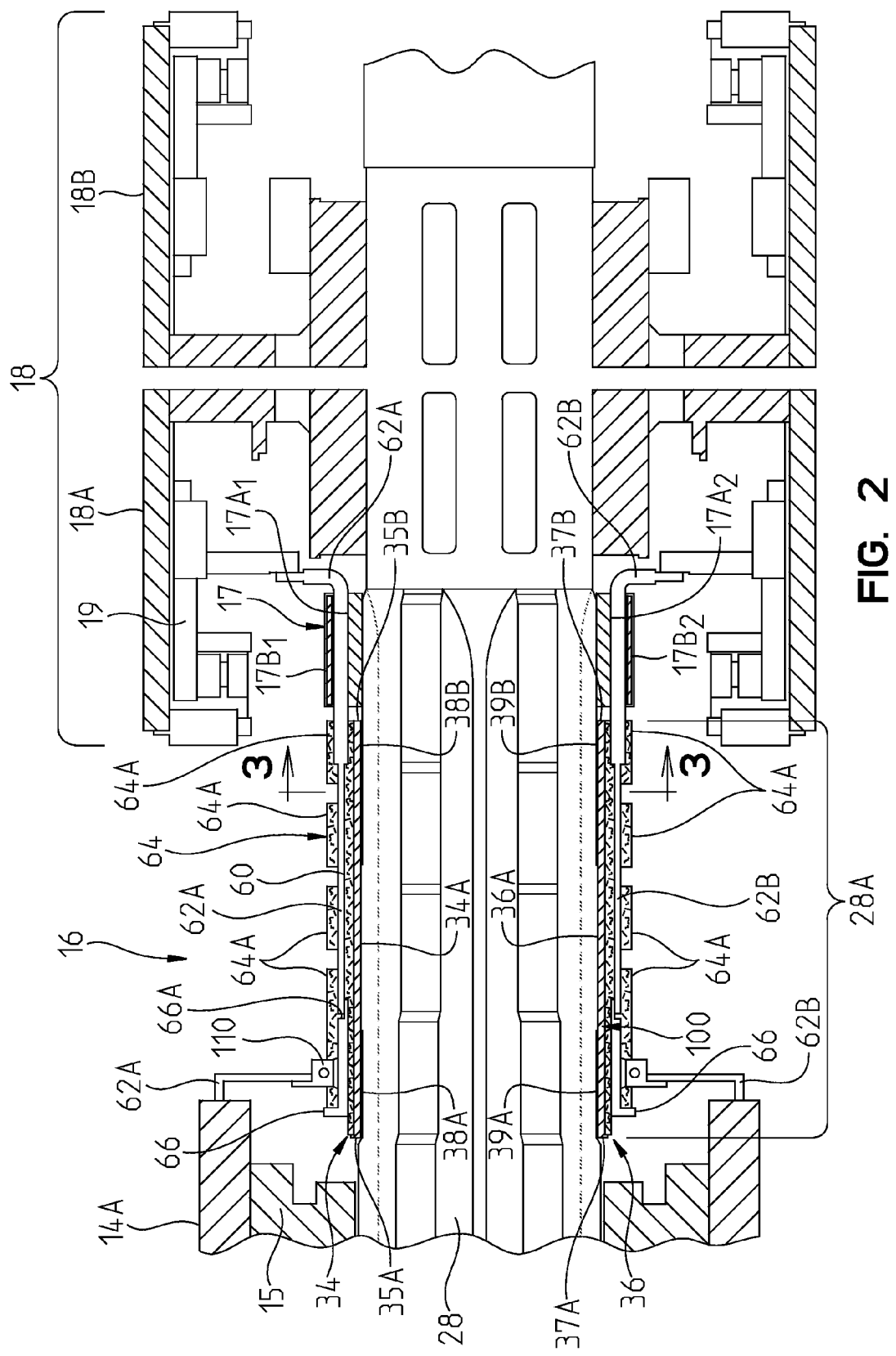
FIG. 2 is a side cross sectional view of a portion of the brushless AC exciter including the phase lead shield illustrated in FIG. 1.
Figure 3:
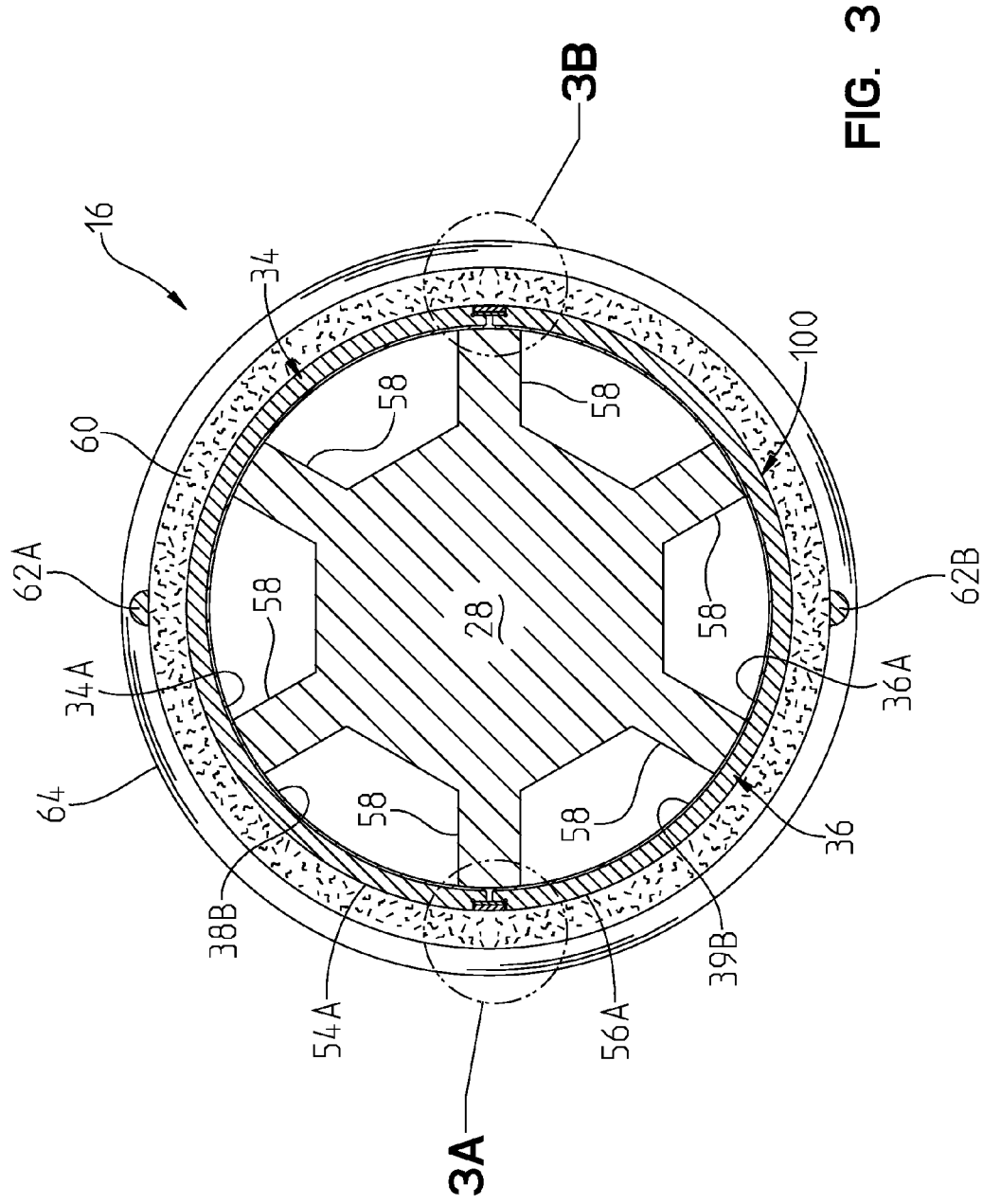
FIG. 3 is an axial cross sectional view of the phase lead shield illustrated in FIG. 1, taken along line 3-3 of FIG. 2.
Figure 4:
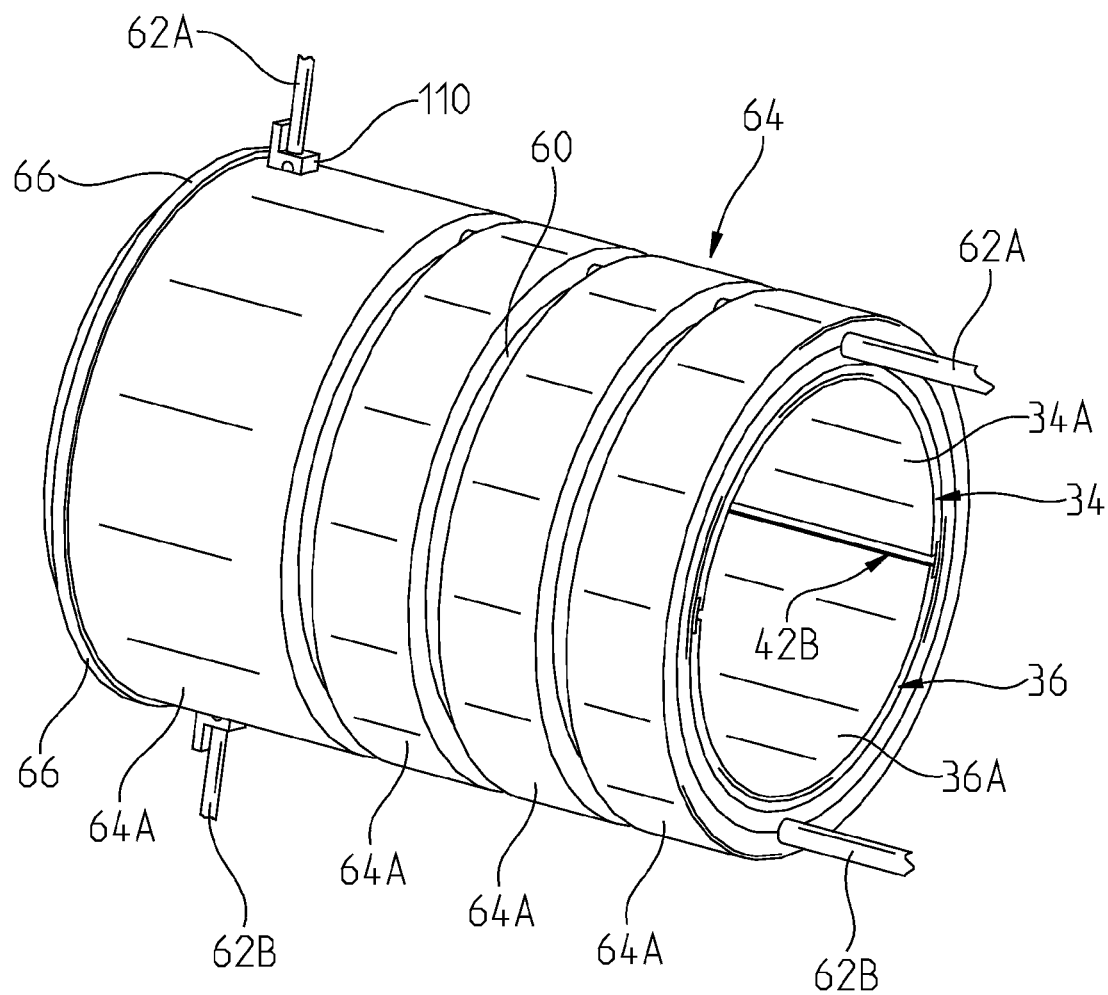
FIG. 4 is a perspective view of the phase lead shield illustrated in FIG. 1 shown removed from the brushless AC exciter.

In the embodiment shown in FIG. 2-4, the phase lead shield 16 comprises first and second arc-shaped main body sections 34, 36, positioned about a selected portion 28A of the shaft 28. The shaft selected portion 28A may extend between the connection ring 15 and the phase lead support 17. Each main body section 34, 36 extends circumferentially about the shaft 28 approximately 180 degrees and has a thickness in a radial direction of about 9.5 mm. As illustrated in FIGS. 3A and 3B, the first main body section 34 has first and second circumferential ends 40A and 40B and the second main body section 36 has third and fourth circumferential ends 41A and 41B. The main body sections 34, 36 are initially positioned such that the first and third circumferential ends 40A and 41A are circumferentially spaced apart, e.g., about 4 mm, to define a first gap 42A therebetween, and the second and fourth circumferential ends 40B and 41B are circumferentially spaced apart, e.g., about 4 mm, to define a second gap 42B therebetween.

The first main body section 34 further includes first and second recesses 44A and 44B extending respectively from the first and second ends 40A and 40B and the second main body section 36 further includes third and fourth recesses 45A and 45B extending respectively from the third and fourth ends 41A and 41B. When the first and second main body sections 34, 36 are initially positioned about the shaft 28, the first and third recesses 44A and 45A define a first slot 46A having circumferentially spaced apart edges 48A and 49A and the second and third recesses 44B and 45B define a second slot 46B having circumferentially spaced apart edges 48B and 49B, see FIGS. 3A and 3B.

The first and second main body sections 34, 36 may be formed from aluminum but may be formed from any suitable material that, along with aluminum, is capable of providing a mechanical support for the phase leads and an electrical barrier for the shaft 28 from flux created by phase lead conductors 62A, 62B, to be discussed below. It is contemplated that the phase lead shield 16 could comprise three or more main body sections.

Referring to FIGS. 3, 3A, and 3B, spanning members comprising elongate first and second straps 50A, 50B are provided respectively in the first and second slots 46A, 46B. The first strap 50A extends widthwise between the circumferentially spaced apart edges 48A and 49A of the first slot 46A and the second strap 50B extends widthwise between the circumferentially spaced apart edges 48B and 49B of the second slot 46B. The straps 50A, 50B span across the circumferential ends 40A, 41A and 40B, 41B of the main body sections 34, 36 so as to form, with the first and second main body sections 34, 36, a continuous cover member 100 disposed about the shaft 28. As shown more clearly in FIGS. 3A and 3B, the width of the first strap 50A is slightly smaller than the distance between the circumferentially spaced apart edges 48A, 49A and the width of the second strap 50B is slightly smaller than the distance between the circumferentially spaced apart edges 48B, 49B, such that the gaps 42A, 42B can decrease without binding the straps 50A, 50B when the continuous cover member 100 is compressed onto the shaft 28 as will be described below. The straps 50A, 50B are formed from aluminum in the embodiment shown but may be formed from any suitable material and are preferably formed from the same material as the material forming the main body sections 34, 36.

Referring to FIG. 2, the first and second main body sections 34, 36 comprise, respectively, inner surfaces 34A, 36A extending between axial first and second ends 35A, 35B, 37A, 37B. Portions of the inner surfaces 34A, 36A may be provided with slip layers 38A, 38B, 39A, 39B, which, in the embodiment shown, comprise a layer of silver plating having a thickness of about 0.13 mm. It is noted that the thicknesses of the slip layers 38A, 38B, 39A, 39B have been exaggerated in the figures for clarity. It is also noted that the slip layers 38A, 38B, 39A, 39B may comprise any suitable layer having a suitable thickness but are preferably formed from a material that is harder than the material from which the first and second main body sections 34, 36 are formed, e.g., aluminum, and softer than the material that forms the shaft 28, e.g., steel. In the illustrated embodiment, the portions of the inner surfaces 34A, 36A having the slip layers 38A, 38B, 39A, 39B thereon are areas that make maximum contact with the shaft 28. It is contemplated that any portion of the inner surfaces 34A, 36A of the main body sections 34, 36, including the entire inner surface 34A, 36A of each main body section 34, 36, may be provided with a slip layer.

The slip layers 38A, 38B, 39A, 39B define a barrier between the main body sections 34, 36 of the phase lead shield 16 and the shaft 28 as the phase lead shield 16 rotates with the shaft 28 during operation. Specifically, the slip layers 38A, 38B, 39A, 39B, which, in the illustrated embodiment, are formed from silver and, hence, are harder than the aluminum forming the main body sections 34, 36, provide a slightly slidable surface in contact with the shaft 28, which is preferably formed from steel, to reduce or avoid fretting between the phase lead shield 16 and the shaft 28, i.e., the silver plating allows the phase lead shield 16 to slide without dragging or abrading the shaft 28. It is noted that the slidable surface provided by the slip layers 38A, 38B, 39A, 39B only provides for a slight amount of slippage axially between the slip layers 38A, 38B, 39A, 39B and the shaft 28, as the phase lead shield 16 rotates with the shaft 28 during operation of the power generating system. The phase lead shield 16 is compressively held onto the shaft 28 via a first holding structure, to be discussed below, so that the phase lead shield 16 rotates with the shaft 28.

Radially inner surfaces 51A, 51B of the straps 50A, 50B, see FIGS. 3A and 3B, are coated with a slip layer 52A, 52B, which, in the embodiment shown, comprises a layer of silver plating having a thickness of about 0.13 mm. It is noted that the thicknesses of the slip layers 52A, 52B have been exaggerated in the figures for clarity. It is also noted that the slip layers 52A, 52B may comprise any suitable material having a suitable thickness but are preferably formed from a material that is harder than the material from which the straps 50A, 50B are formed. It is further noted that the slip layers 52A, 52B of the straps 50A, 50B are preferably substantially similar to the slip layers 38A, 38B, 39A, 39B provided on the main body sections 34, 36 in material and thickness. Hence, the main body sections 34, 36 and the straps 50A, 50B may each be formed from aluminum and the slip layers 38A, 38B, 39A, 39B of the sections 34, 36 and the slip layers 52A, 52B of the straps 50A, 50B may each comprise silver plated layers.

The straps 50A, 50B may initially extend radially outwardly slightly further than radial outer surfaces 54A, 56A of the first and second main body sections 34, 36 such that when the continuous cover member 100 is installed on the shaft 28, as will be described below, the straps 50A, 50B may be radially compressed to form a tight fit with the main body sections 34, 36. As noted above, the width of the first strap 50A is slightly smaller than the distance between the circumferentially spaced apart edges 48A, 49A and the width of the second strap 50B is slightly smaller than the distance between the circumferentially spaced apart edges 48B, 49B, such that the gaps 42A, 42B can decrease without binding the straps 50A, 50B when the continuous cover member 100 is installed onto the shaft 28.

As illustrated in FIG. 3, the straps 50A, 50B are preferably aligned with and positioned over shaft arms 58 defined in the shaft 28, which shaft arms 58 may comprise radial arms in the shaft 28. It is noted that the shaft arms 58 have been removed from FIGS. 3A and 3B for clarity. The straps 50A, 50B are aligned over the shaft arms 58 to radially support first and second circumferential end portions 140A, 140B of the first main body section 34 and third and fourth circumferential end portions 141A, 141B of the second main body section 36 during installation of the phase lead shield 16. In the embodiment shown in FIG. 3, the shaft 28 comprises six shaft arms 58, that are substantially equally spaced around the circumference of the shaft 28. Accordingly, the phase lead shield 16 may be disposed in six potential configurations on the shaft 28, i.e., the first strap 50A, which is located 180 degrees from the second strap 50B in the embodiment shown, may be disposed over any one of the six shaft arms 58 of the shaft 28, wherein the second strap 50B would be disposed over the shaft arm 58 that is located 180 degrees from the shaft arm 58 that the first strap 50A is located over. It is noted that the phase lead shield 16 may be arranged in other configurations, i.e., the phase lead shield 16 need not be arranged such that the straps 50A, 50B are arranged over the shaft arms 58 of the shaft 28.

The phase lead shield 16 further comprises a first holding structure comprising, in the illustrated embodiment, a first glass structure or layer 60 disposed about the continuous cover member 100, which, as noted above, is defined by the first and second main body sections 34, 36 and the straps 50A, 50B, see FIGS. 2-4, 3A, and 3B. The first glass structure 60 in the embodiment shown comprises a fiber glass with polyester resin strand wound about the continuous cover member 100 for sufficient mechanical support and geometric structure so as to form a reinforcement fiber/polymeric material layer over the cover member 100. The first holding structure may be formed from other reinforcement fiber/polymeric material combinations. It is noted that the straps 50A, 50B could be secured to the first and second main body sections 34, 36, such as, for example, by welding, in which case the first glass structure 60 would not be required to mechanically support the continuous cover member 100 on the shaft 28.

The phase lead shield 16 further comprises the phase lead conductors 62A, 62B, noted above, which conductors 62A, 62B comprise copper wires providing electrical communication between the AC armature 14A of the main exciter 14 and the diode wheel assembly circuitry 19. An end section 66A having an axial length of about 1 inch and including a lip 66 and an axial strand base 110 are brazed to the conductors 62A, 62B. The phase lead conductors 62A, 62B are mechanically supported in slots 17A$_1$, 17A$_2$, respectively formed in the phase lead support 17 via wedges 17B$_1$, 17B$_2$, which wedges 17B$_1$, 17B$_2$ are secured to the phase lead support 17 to support the phase lead conductors 62A, 62B in the slots 17A$_1$, 17A$_2$. Further, the phase lead conductors 62A, 62B, the end section 66A and the axial strand base 110 are disposed on a radially outer surface of the first glass structure 60.

The phase lead shield 16 also comprises a second holding structure, which, in the illustrated embodiment, comprises a second glass structure 64. The second glass structure 64 functions to hold the phase lead conductors 62A, 62B in place on the outer surface of the first glass structure 60. The second glass structure 64 may comprise, for example, a glass fiber/polyester fiber strand wound about the phase lead conductors 62A, 62B and the first glass structure 60. It is noted that the second glass structure 64 may comprise one or more individually applied bands 64A as shown in FIGS. 2 and 4 to allow for cooling between the adjacent bands 64A or may comprise other configurations, such as, for example, a single continuous band extending along substantially the entire outer surface of the first glass structure 60. The second holding structure may be formed from other reinforcement fiber/polymeric material combinations.

It is also noted that the lip 66, which extends radially outwardly, see FIG. 2, assists in maintaining the second glass structure 64 in place, i.e., to prevent the second glass structure 64 from sliding axially off of the end section 66A.

To assemble the phase lead shield 16 onto the shaft 28, the first and second main body sections 34, 36 are disposed about the shaft selected portion 28A and the straps 50A, 50B are disposed in their respective slots 46A, 46B. It is noted that a single main body section (not shown) may be used and disposed about the selected portion 28A of the shaft 28. For example, the single main body section, i.e., a generally rectangular and flat piece of material, could be disposed adjacent to the selected portion 28A of the shaft 28 and bent around the shaft 28 such that a single slot would be formed between two opposite circumferential ends of the single main body section (which would be located adjacent to each other as a result of the single main body section being bent around the shaft 28.) In that case, only a single strap (not shown) could be used and disposed in the respective slot between the two opposite circumferential ends of the single main body section.

The first holding structure is formed in the illustrated embodiment by wrapping a glass fiber/polyester fiber strand about the continuous cover member 100 to form a first glass structure 60 extending substantially the entire axial length of the continuous cover member 100. The AC exciter 10, including the first glass structure 60, the continuous cover member 100 and the shaft 28 are placed in a heating apparatus (not shown) and heated to a temperature, such that the polyester resin in the fiber glass with polyester resin strand are cured. Thereafter, the AC exciter 10, including the first glass structure 60, the continuous cover member 100 and the shaft 28 are removed from the heating apparatus and allowed to cool. It is noted that the heating apparatus may be configured such that only a selected portion of the AC exciter 10 is disposed and heated therein, such as the shaft selected portion 28A, the first glass structure 60, and the continuous cover member 100.

As the first glass structure 60 is heated, cured and solidified, the continuous cover member 100, including the first and second main body sections 34, 36, are compressed onto the shaft 28. As the first and second main body sections 34, 36 are compressed, the first and second gaps 42A, 42B formed between the circumferential ends 40A, 41A and 40B, 41B of the first and second main body sections 34, 36 become smaller. Specifically, as the main body sections 34, 36 are compressed on the shaft 28, the circumferential ends 40A, 41A and 40B, 41B of the respective main body sections 34, 36 are brought more closely together such that the gaps 42A, 42B become smaller. However, the gaps 42A, 42B, while being smaller, may nonetheless remain between the main body sections 34, 36 such that the circumferential ends 40A, 41A and 40B, 41B of the main body sections 34, 36 do not come into contact with each other.

Once the polymeric material, i.e., the polyester material, in the first glass structure 60 has cured, the phase lead conductors 62A, 62B, including the end section 66A and the axial strand base 110, are placed/positioned on the outer surface of the first glass structure 60. Thereafter, the second holding structure is formed, in the illustrated embodiment, by wrapping a fiber glass with polyester resin strand about the continuous cover member 100 to form the second glass structure 64. The AC exciter 10, including the second glass structure 64, the first glass structure 60, the phase lead conductors 62A, 62B, the continuous cover member 100 and the shaft 28 are placed in a heating apparatus (not shown) and heated to a temperature, such that the polyester resin in the fiber glass with polyester resin strand are cured. Thereafter, the AC exciter 10, including the second glass structure 64, the first glass structure 60, the phase lead conductors 62A, 62B, the continuous cover member 100 and the shaft 28 are removed from the heating apparatus and allowed to cool such that the polyester material is cured. It is noted that the heating apparatus may be configured such that only a selected portion of the AC exciter 10 is disposed and heated therein, such as the shaft selected portion 28A, the phase lead conductors 62A, 62B, the first glass structure 60, and the continuous cover member 100 and the second glass structure 64. The phase lead conductors 62A, 62B may then be secured to the phase lead support 17 and electrically connected to the AC armature 14A of the main exciter 14.

During operation of the brushless AC exciter 10, the rotating magnetic poles 12A of the permanent magnet generator 12 induce a voltage and current into the stationary armature structure 12B of the permanent magnet generator 12. The voltage output is tied to an automatic voltage regulator (not shown) which controls the voltage level and also feeds this voltage to the stationary field structure 14B of the main exciter 14. This in turn induces an AC current in the AC armature 14A of the main exciter 14. This AC current is carried by the phase lead conductors 62A, 62B to the diode wheel assembly circuitry 19 of the diode wheel assembly 18, which rectifies (converts) the AC current into a DC current and voltage. The DC current is then transferred to the generator rotor.

Since the phase lead shield 16 comprises two main body sections 34, 36, the phase lead shield 16 can be installed on or removed from the shaft 28 without removing the phase lead support 17, the diode wheel assembly 18, the main lead support and vent seal 20, and the exciter coupling 22 (collectively referred to as "additional components" hereinafter). For example, each of the main body sections 34, 36 may be disposed in its desired location on the shaft 28. The straps 50A, 50B may then be disposed in their respective slots 46A, 46B to form the continuous cover member 100. Thereafter, the first holding structure may be applied to compress the first and second main body sections 34, 36 on the shaft 28. This is advantageous over one-piece prior art phase lead shields, which require that all or some of the additional components be removed from the shaft 28, i.e., so that the one-piece phase lead shield can be disposed about the appropriate section of the shaft 28 and shrink fitted thereon.

Moreover, since the main body sections 34, 36 of the phase lead shield 16 include the slip layer coatings 38A, 38B, 39A, 39B applied to the radially inner surfaces 34A, 36A thereof, the phase lead shield 16 is slightly slidable with respect to the shaft 28 and therefore fretting between the phase lead shield 16 and the shaft 28 is substantially reduced or eliminated.

Fretting is undesirable as it may cause damage, such as, for example, cracking, to either or both of the phase lead shield 16 and the shaft 28. It is noted that the phase lead shield 16 can be placed in substantially the same location on the shaft 28 as prior art one-piece phase lead shields, and can have approximately the same dimensions of prior art one-piece phase lead shields, so that the overall dimensions and functionality of the brushless AC exciter 10 remain substantially unaltered, which reduces a complexity of installing and using the phase lead shield 16.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A shaft cover structure for use in an exciter comprising:
   at least two sections located about a selected portion of a rotatable shaft and positioned such that adjacent circumferential ends of said at least two sections are spaced apart to define gaps therebetween, a recess extends from each circumferential end such that adjacent recesses define a slot; and
   a spanning member disposed in each of said slots such that said sections and said spanning members cooperate to form a continuous cover member that surrounds the selected portion of said shaft.

2. The shaft cover structure according to claim 1, wherein at least a portion of an inner surface of each of said sections includes a slip layer.

3. The shaft cover structure according to claim 2, wherein said slip layer is defined by a silver plated layer.

4. The shaft cover structure according to claim 2, wherein at least a portion of an inner surface of each of said spanning members includes a slip layer.

5. The shaft cover structure according to claim 1, wherein said spanning members are circumferentially aligned with shaft arms defined in said shaft and extend axially substantially parallel to said shaft arms.

6. The shaft cover structure according to claim 1, further comprising first holding structure that secures said continuous member on said selected portion of said shaft.

7. The shaft cover structure according to claim 6, wherein said first holding structure comprises a first glass structure wound about said continuous cover member.

8. The shaft cover structure according to claim 7, further comprising at least one phase lead conductor located on a radially outer surface of said first glass structure.

9. The shaft cover structure according to claim 8, further comprising a second holding structure including a second glass structure that secures said at least one phase lead conductor onto said outer surface of said first glass structure.

10. The shaft cover structure according to claim 1, wherein said sections are formed from aluminum.

11. The shaft cover structure according to claim 9, wherein said spanning members are formed from aluminum.

12. A shaft cover structure in an exciter comprising:
   at least one section located about a selected portion of a rotatable shaft and positioned such that at least one slot is defined to extend across at least one pair of adjacent circumferential ends of said at least one section;
   at least one spanning member disposed in said at least one slot such that said at least one section and said at least one spanning member cooperate to form a continuous cover member that surrounds the selected portion of said shaft; and first holding structure that secures said continuous member on said selected portion of said shaft.

13. The shaft cover structure according to claim 12, wherein at least a portion of an inner surface of said at least one section includes a slip layer.

14. The shaft cover structure according to claim 13, wherein said slip layer is defined by a silver plated layer.

15. The shaft cover structure according to claim 13, wherein at least a portion of an inner surface of said at least one spanning member includes a slip layer.

16. The shaft cover structure according to claim 12, wherein said at least one spanning member is circumferentially aligned with at least one shaft arm defined in said shaft and extends axially substantially parallel to said at least one shaft arm.

17. The shaft cover structure according to claim 12, wherein said first holding structure comprises a first glass structure wound about said continuous cover member.

18. The shaft cover structure according to claim 17, further comprising at least one phase lead conductor located on a radially outer surface of said first glass structure.

19. The shaft cover structure according to claim 18, further comprising a second holding structure including a second glass structure that secures said at least one phase lead conductor onto said outer surface of said first glass structure.

20. A shaft cover structure in an exciter comprising:

at least two sections located about a selected portion of a rotatable shaft and positioned such that at least two slots are defined to extend across at least two pairs of adjacent circumferential ends of said at least two sections;

at least one spanning member disposed in each of said slots such that said at least two sections and said spanning members cooperate to form a continuous cover member that surrounds the selected portion of said shaft; and first holding structure that secures said continuous member on said selected portion of said shaft.

* * * * *